United States Patent
Tomita et al.

(10) Patent No.: US 12,211,527 B2
(45) Date of Patent: Jan. 28, 2025

(54) HARD DISK DRIVE MULTIPLE DISK PACK STACKING STRUCTURE

(71) Applicant: Western Digital Technologies, Inc., San Jose, CA (US)

(72) Inventors: Takashi Tomita, Yokohama (JP); Yasuhiro Sakata, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/223,469

(22) Filed: Jul. 18, 2023

(65) Prior Publication Data

US 2024/0161773 A1    May 16, 2024

Related U.S. Application Data (60) Provisional application No. 63/426,015, filed on Nov. 16, 2022.

(51) Int. Cl.
*G11B 5/48* (2006.01)
*G11B 25/04* (2006.01)

(52) U.S. Cl.
CPC .......... *G11B 5/4813* (2013.01); *G11B 25/043* (2013.01)

(58) Field of Classification Search
None
See application file for complete search history.

(56) References Cited

U.S. PATENT DOCUMENTS

| | | | |
|---|---|---|---|
| 3,566,381 A * | 2/1971 | Buslik et al. | G11B 17/038 360/78.04 |
| 3,724,652 A * | 4/1973 | Francini | G11B 5/825 |
| 3,902,195 A * | 8/1975 | Osako | G11B 5/5521 |
| 5,764,430 A | 6/1998 | Ottesen et al. | |
| 6,005,747 A | 12/1999 | Gilovich | |
| 6,590,749 B1 | 7/2003 | Gill | |
| 6,628,469 B1 | 9/2003 | Hoyt | |
| 7,266,881 B1 | 9/2007 | Money | |
| 7,305,572 B1 | 12/2007 | Burroughs et al. | |
| 7,646,563 B2 * | 1/2010 | Oishi | G11B 17/038 360/98.02 |
| 10,332,555 B1 | 6/2019 | Keshavan et al. | |

(Continued)

FOREIGN PATENT DOCUMENTS

| JP | 02206083 A * | 8/1990 |
|---|---|---|
| JP | H05258437 A | 10/1993 |

(Continued)

OTHER PUBLICATIONS

Translation of JP 02206083 A, Maekawa H et al, published Aug. 15, 1990 (Year: 1990).*

(Continued)

*Primary Examiner* — William J Klimowicz
(74) *Attorney, Agent, or Firm* — John D. Henkhaus (57) ABSTRACT

A multi-disk pack hard disk drive includes first and second spindle motor assemblies mounted one over the other on a base post. Each motor assembly may include a compact axial flux motor. The motor wiring for each may be routed within a structural cutout feature of the base post to an electrical connector at the base. A compact threaded disk clamp and motor hub interface may be implemented to further reduce the vertical height of the multi-disk pack assembly.

22 Claims, 8 Drawing Sheets

(56) References Cited

U.S. PATENT DOCUMENTS

| | | | |
|---|---|---|---|
| 10,891,980 B1* | 1/2021 | Keshavan | G11B 25/043 |
| 11,062,734 B1 | 7/2021 | Brand | |
| 11,315,592 B1 | 4/2022 | Carper et al. | |
| 11,348,607 B1* | 5/2022 | Keshavan | G11B 5/4826 |
| 11,456,009 B1* | 9/2022 | Liu | G11B 5/4813 |
| 2005/0036234 A1 | 2/2005 | Takada et al. | |
| 2005/0036244 A1 | 2/2005 | Carey et al. | |
| 2006/0113855 A1* | 6/2006 | Tsai | H02K 7/085 |
| | | | 310/156.32 |
| 2006/0158777 A1 | 7/2006 | Kim et al. | |
| 2009/0013342 A1 | 1/2009 | Gilovich | |
| 2019/0333533 A1 | 10/2019 | Mendonsa et al. | |
| 2020/0202891 A1 | 6/2020 | Mendonsa et al. | |
| 2022/0176581 A1 | 6/2022 | Haupl | |
| 2023/0055529 A1 | 2/2023 | Chen et al. | |
| 2023/0142716 A1* | 5/2023 | Han | G11B 19/28 |
| | | | 713/330 |
| 2024/0105222 A1* | 3/2024 | Park | G11B 5/5573 |

FOREIGN PATENT DOCUMENTS

| | | | |
|---|---|---|---|
| JP | H05298815 A | 11/1993 | |
| JP | 2005327371 A | 11/2005 | |
| JP | 2021136044 A | 9/2021 | |
| JP | 2022125632 A | 8/2022 | |

OTHER PUBLICATIONS

Israel Patent Office (ISA/IL), PCT International Search Report and Written Opinion for International application No. PCT/US2022/035036, Oct. 26, 2022, 10 pages.

* cited by examiner

HARD DISK DRIVE MULTIPLE DISK PACK STACKING STRUCTURE

FIELD OF EMBODIMENTS

Embodiments of the invention may relate generally to data storage devices, and particularly to a hard disk drive having multiple disk stacks.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") housed in a slider that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic-recording disk, which in turn magnetizes a small area on the recording medium.

Increasing areal density (a measure of the quantity of information bits that can be stored on a given area of disk surface) is one of the on-going goals of hard disk drive technology evolution. In one form, this goal manifests in the type of high-capacity HDDs that are especially attractive in the context of enterprise, cloud computing/storage, and data center environments. However, the performance of high-capacity HDDs has not necessarily scaled up commensurately with the increases in capacity. This has led to the need to develop and implement various means to increase high-capacity HDD performance, which has shifted some of the burden onto the mechanics. One approach to the foregoing is to increase the number of disks within the prescribed form factor. As these HDDs are primarily used for near-line storage in data centers in hyper-scale environments, the performance of these high-capacity drives also has to satisfy the IOPs (Input/Output Operations Per Second) density requirements (in some instances, similarly referred to as IOPs/TB) to minimize latency. This demand has led to a shift to multiple actuators for providing parallel access to data.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Generally, approaches to a multiple spindle motor hard disk drive (HDD) are described. The term "spindle motor" is used herein in reference to a recording disk media spindle motor assembly configured to spin the disk media for data read (and possibly write) operations, such as the drive motor described in reference to FIG. 1. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall the observation that the performance of high-capacity HDDs has not scaled up commensurately with increases in storage capacity. The high latencies of large capacity HDDs in a clustered environment, such as in data centers with multiple clustered nodes, results in a bottleneck due to slower access to stored data. The pressure to increase the performance (e.g., IOPS) by reducing the latencies for data operations of high-capacity HDDs has become even stronger as capacities of HDDs continue to increase. One possible approach to increasing HDD performance is the implementation of multi-actuator systems, in which multiple independently operating actuators are assembled onto, for example, a single shared pivot shaft in order to independently and concurrently read from and/or write to multiple recording disks of a disk stack. However, the embodiments described herein are not reliant or dependent on a multi-actuator arrangement.

Figure 1:
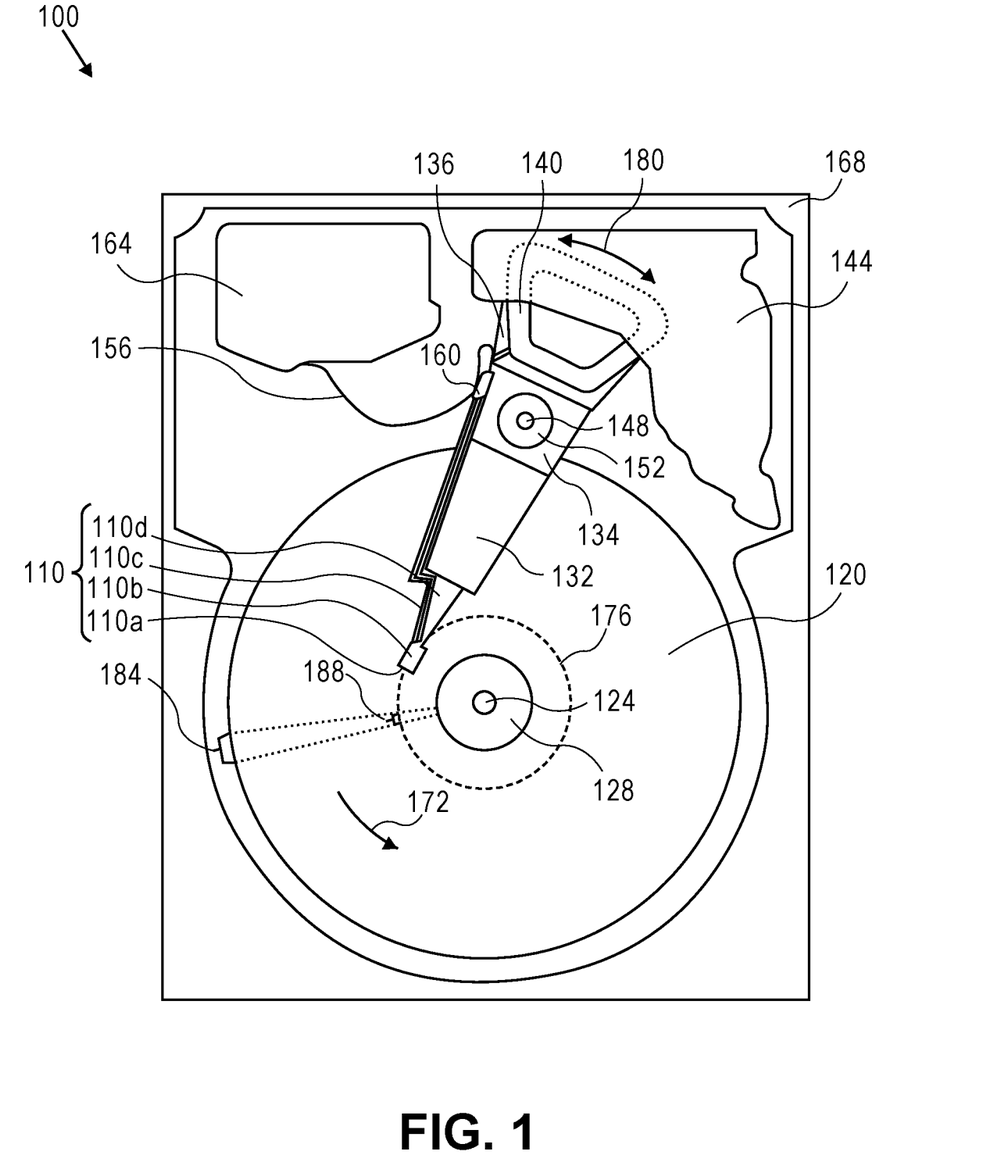
FIG. 1 is a plan view illustrating a hard disk drive (HDD), according to an embodiment.
Figure 2:
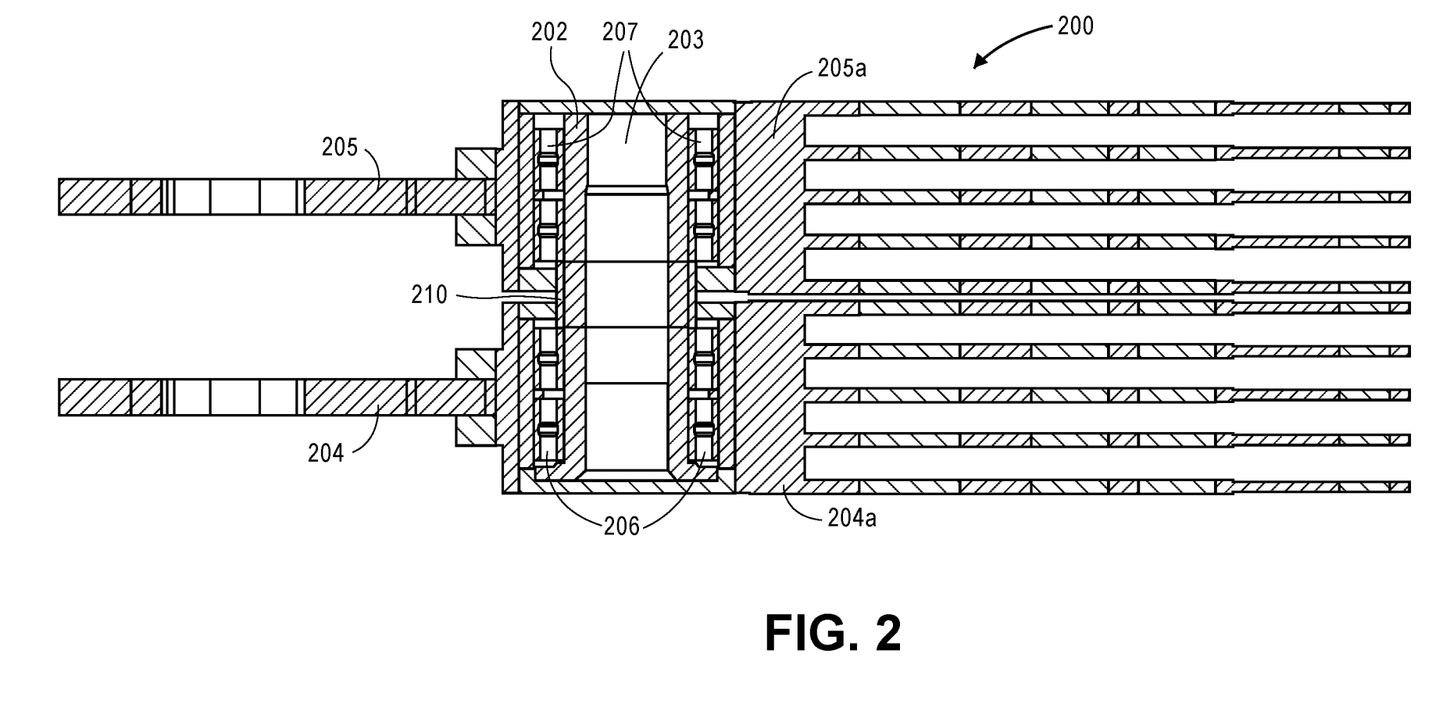
FIG. 2 is a cross-sectional side view illustrating a dual-actuator system, according to an embodiment.

FIG. 2 is a cross-sectional side view illustrating a dual-actuator system, according to an embodiment. Actuator system 200, generalized, comprises a shaft 202 having a bore 203 at least partially therethrough. According to an embodiment, the shaft 202 is utilized as a pivot shaft, or part of an actuator pivot assembly or shared shaft assembly, for multiple actuators constituent to a multi-actuator data storage device such as a hard disk drive (HDD). As such, actuator system 200 comprises the shaft 202, around which a first or lower rotary actuator assembly 204 (e.g., a voice coil actuator, and including a carriage 204a, such as carriage 134 of FIG. 1) is rotatably coupled at a first location of shaft 202, with a lower bearing assembly 206 interposed therebetween, and around which a second upper rotary actuator assembly 205 (e.g., a voice coil actuator, and including a carriage 205a, such as carriage 134 of FIG. 1) is rotatably coupled at a second location of shaft 202, with an upper bearing assembly 207 interposed therebetween. Alternatively and according to an embodiment, the functionality of the shaft 202 utilized as a pivot shaft may be implemented with separate shafts, e.g., one for each respective actuator assembly 204, 205, rather than a shared shaft assembly such as shaft 202. This could provide for decoupling of undesired structural dynamics associated with the independent operation of multiple actuator assemblies, such as actuator assembly 204 and actuator assembly 205, mounted on a single shared shaft. Each actuator assembly 204, 205 in conjunction with its corresponding head-stack assembly (HSA) and head-gimbal assemblies (HGAs) may generally operate independently and concurrently to read from and/or write to multiple recording disks of a disk stack, similarly to as illustrated and described in reference to FIG. 1 for a single-actuator HDD.

Furthermore, there is an increasing need for archival storage. Tape is a traditional solution for data back-up, but is very slow to access data. Current archives are increasingly "active" archives, meaning some level of continuing random read data access is required. Traditional hard disk drives (HDDs) can be used but cost may be considered undesirably high. Other approaches considered may include HDDs with extra-large diameter disks and HDDs having an extra tall form factor, with both requiring large capital investment due to unique components and assembly processes, low value proposition in the context of cost savings, and barriers to adoption in the marketplace due to uniquely large form factors, for example. However, one possible approach involves a standard HDD form factor (e.g., a 3.5" form factor) and largely common HDD architecture, with n disks in one or more rotating disk stacks, but containing fewer than 2n read-write heads. Such a storage device may utilize an articulation mechanism that can move the heads to mate with the different disk surfaces (for a non-limiting example, only 2 heads but 5+ disks for an air drive or 8+ disks for a He drive), where the primary cost savings may come from eliminating the vast majority of the heads in the drive.

One such approach may involve an actuator subsystem which transforms rotary motion into linear motion, such as with a stepper motor disposed within a ball screw cam assembly to form an actuator elevator subassembly, which is disposed within the actuator pivot and pivot bearing of the actuator subsystem (e.g., the "pivot cartridge") and is configured to vertically translate at least one actuator arm along with a respective HGA to access disk media corresponding to one or multiple disk packs. One such non-limiting approach is described in U.S. Pat. No. 10,811,044 to Myers et al., entitled "In-Pivot Stepper Motor For Ball Screw Cam Elevator Mechanism for Cold Storage Data Storage Device", the entire content of which is incorporated by reference for all purposes as if fully set forth herein. Another such non-limiting approach is described in U.S. Pat. No. 10,902,871 to Myers et al., entitled "Low-Profile Ball Screw Cam Elevator Mechanism for Cold Storage Data Storage Device", the entire content of which is incorporated by reference for all purposes as if fully set forth herein. Yet another non-limiting approach involving an elevator platform assembly for moving an actuator assembly is described in U.S. Pat. No. 11,031,037 to Garbarino, entitled "System For Disk-To-Disk Access For Reduced-Head Data Storage Device", the entire content of which is incorporated by reference for all purposes as if fully set forth herein.

Multiple Disk Pack System

Figure 3A:
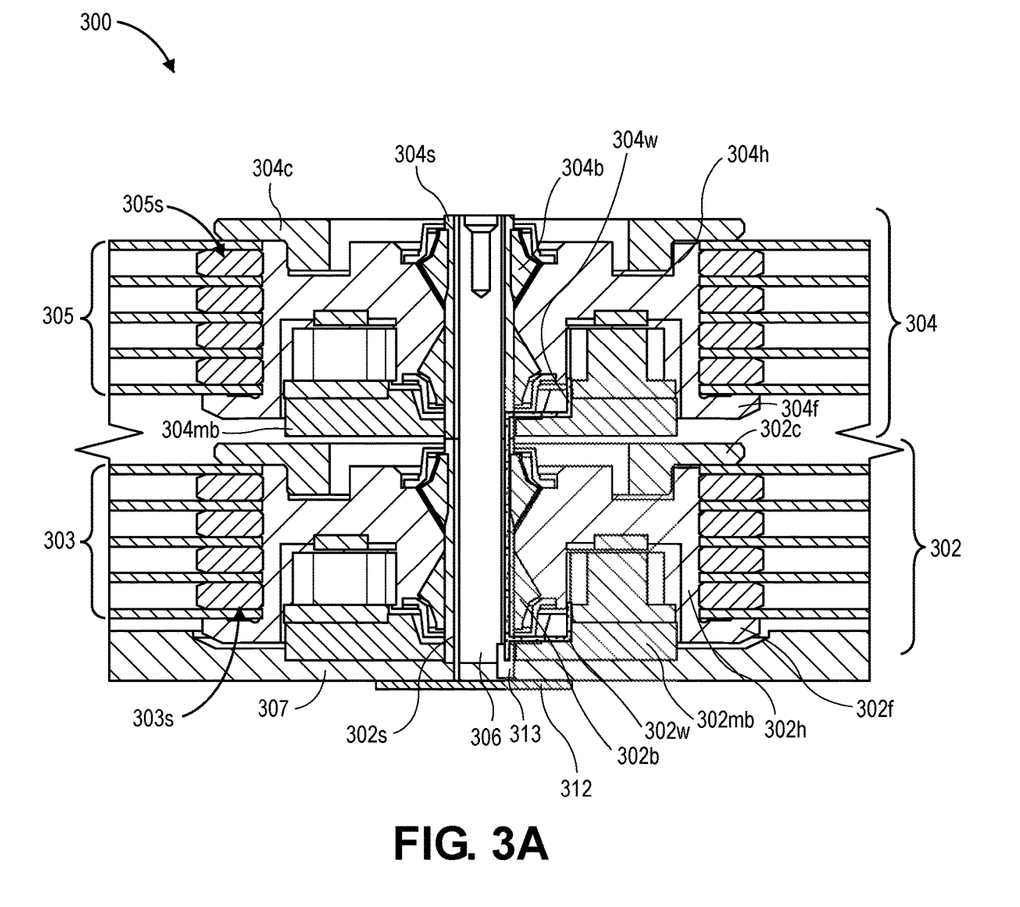
FIG. 3A is a cross-sectional side view illustrating an HDD multiple disk pack system, according to an embodiment.
Figure 3B:
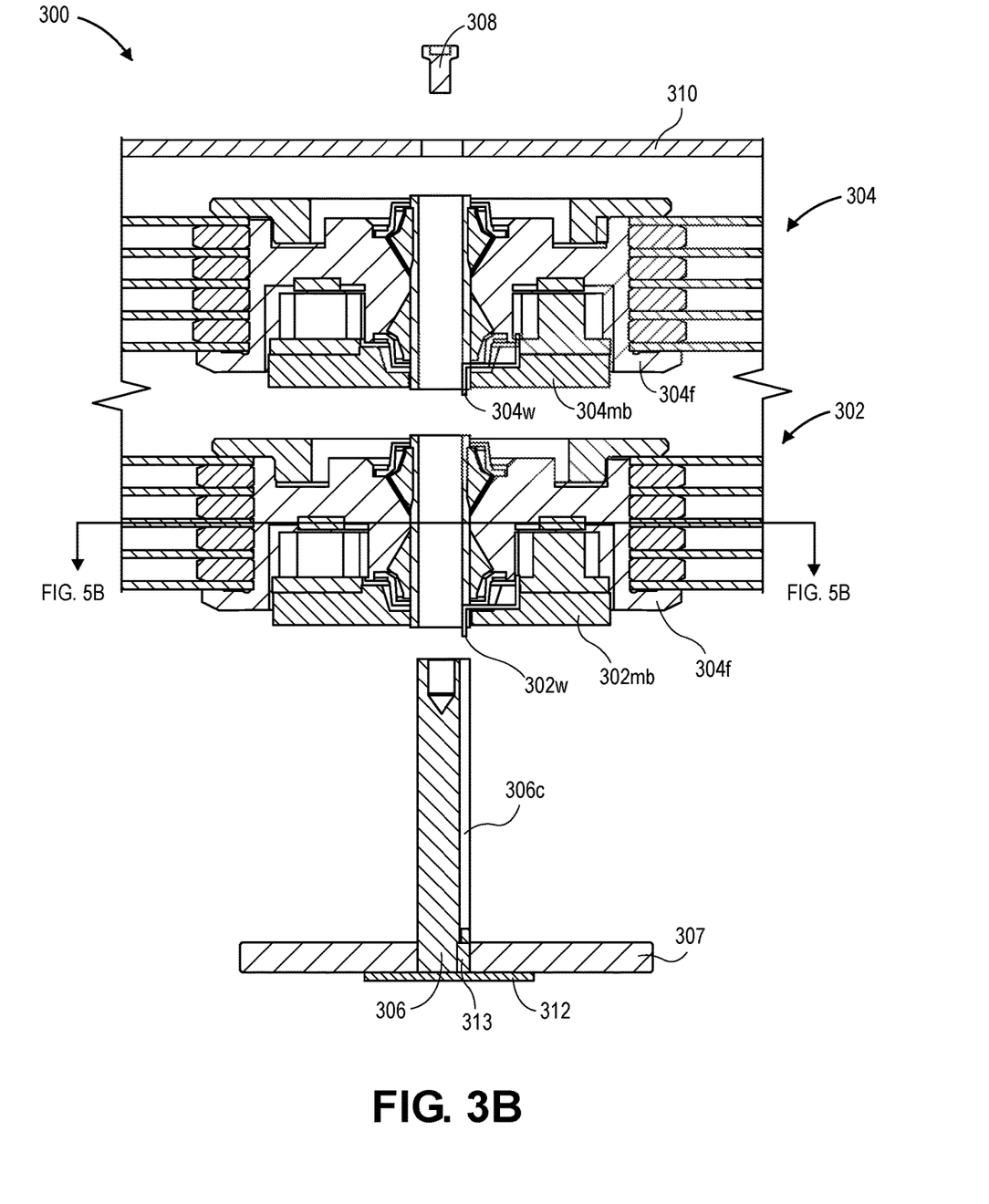
FIG. 3B is an exploded cross-sectional side view illustrating the multiple disk pack system of FIG. 3A, according to an embodiment.

FIG. 3A is a cross-sectional side view illustrating a hard disk drive (HDD) multiple disk pack system, and FIG. 3B is an exploded cross-sectional side view illustrating the multiple disk pack system of FIG. 3A, both according to an embodiment. Multi-disk pack system 300 comprises a first (also "lower" or "bottom") spindle motor assembly 302 and a second (also "upper" or "top") spindle motor assembly 304, both mounted on a base part comprising a base post 306 extending from a base platform 307, and each configured to operate independently of the other. Note that this arrangement may also implement further spindle motor assemblies beyond the two depicted, and the number of independent disk packs may be equal to or unequal to the number of corresponding actuator assemblies implemented. Indeed, it is contemplated that multi-disk pack system 300 may be implemented with a single actuator configuration and still offer advantages over a conventional single actuator system. It is further contemplated that multi-disk pack system 300 may be implemented with an actuator elevator subassembly configuration as referenced elsewhere herein, with some coordinated control between one or more of the spindle motor assemblies 302, 304 and the actuator elevator subassembly.

According to an embodiment, each spindle motor assembly 302, 304 comprises a corresponding flange and disk clamp. Thus, first spindle motor assembly 302 comprises a first flange 302f and first motor bracket 302mb and a first disk clamp 302c, and second spindle motor assembly 304 comprises a second flange 304f and second motor bracket 304*mb* and a second disk clamp 304*c*. According to an embodiment, the first spindle motor assembly 302 is mounted on the base post 306 such that the first motor bracket 302*mb* interfaces with the base platform 307, and the second spindle motor assembly 304 is mounted on the base post 306 over, above, on top of the first spindle motor assembly 302 such that the second motor bracket 302*mb* interfaces with the first disk clamp 302*c*. Consideration is given to an intermediate structure positioned between the first and second spindle motor assemblies 302, 304 such as a spacer or damper or other support part to improve the structural stability, individual and coupled dynamic responses, operational shock response, and the like, for example. According to an embodiment, each of the first and second spindle motor assemblies 302, 304 comprises a hollow shaft 302*s*, 304*s* to mount onto the base post 306, i.e., through which the base post 306 is positioned.

Generally, each spindle motor assembly 302, 304 is configured as a modular assembly, pre-assembled to comprise for example a corresponding fluid dynamic bearing 302*b*, 304*b* and a plurality of disk media 303, 305 mounted on a hub 302*h*, 304*h* (also "spindle motor hub" or "spindle hub") and separated by spacers 303*s*, 305*s* as is typical with HDDs. Hence, assembly of the multiple spindle motor assemblies 302, 304 onto the base post 306 in the configuration depicted is considered a relatively simple and straightforward process, including fastening the multiple spindle motor assemblies 302, 304 onto the base part, i.e., the base post 306, via a screw 308 (FIG. 3B) or some other type of common fastener threadedly engaged with the base post 306 through an HDD cover 310 (FIG. 3B).

However, one challenge with a multi-disk pack HDD involves the need to now power each of the independent spindle motor assemblies 302, 304, e.g., an approach to electrically connecting the upper spindle motor 304 to the electronics (e.g., a flexible printed circuit, or "FPC 312") coupled with the bottom of the base part, rather than having to implement further electronic circuitry at the top of the HDD. According to an embodiment, system 300 further comprises an electrical connector 313 (FIG. 3B) mechanically coupled with the base part and electrically coupled with the FPC 312 (FIG. 3B), and where the first spindle motor assembly 302 further comprises first electrical wiring 302*w* routed along the base post 306 to the electrical connector 313 and the second spindle motor assembly 304 further comprises second electrical wiring 304*w* routed along the base post 306 to the electrical connector 313. According to an embodiment, each of the first and second electrical wiring 302*w*, 304*w* is routed within a structural cutout 306*c* feature (e.g., a recess) of the base post 306. Here, any remaining space around the wiring at the bottom of or interface area with the base part can be filled with a glue or other material to provide hermetic sealing if desired.

Figure 4:
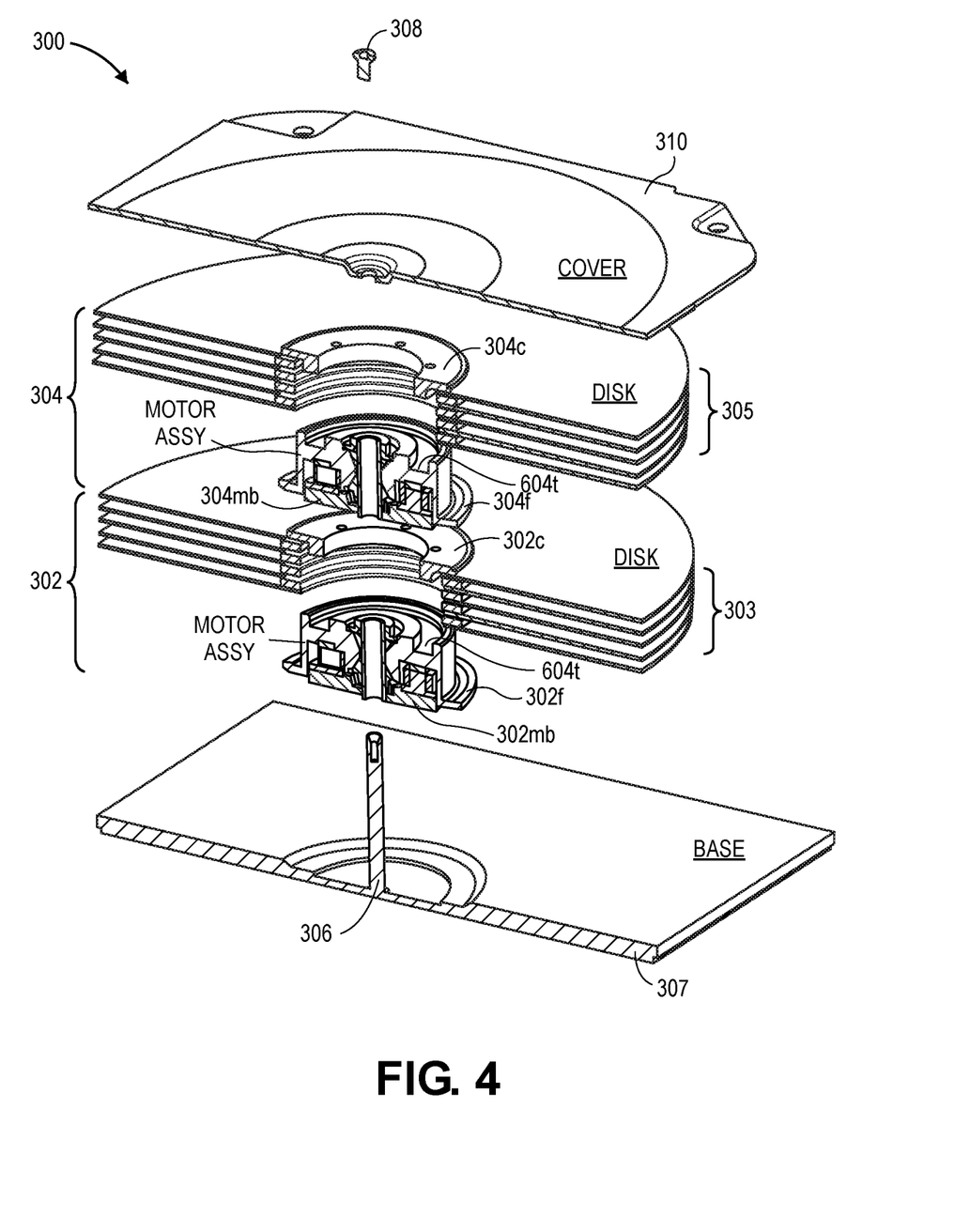
FIG. 4 is an exploded cross-sectional perspective view further illustrating the HDD multiple disk pack system of FIG. 3A, according to an embodiment.

FIG. 4 is an exploded cross-sectional perspective view further illustrating the HDD multiple disk pack system of FIG. 3A, according to an embodiment. FIG. 4 provides additional illustration of the multi-disk pack system 300 comprising the first spindle motor assembly 302 comprising the first flange 302*f* and first disk clamp 302*c* clamping and holding the first plurality of disk media 303, and the second spindle motor assembly 304 comprising the second flange 304*f* and second disk clamp 304*c* clamping and holding the second plurality of disk media 305, both of which are mounted over, on the base post 306 extending from the base platform 307. Here too, first motor bracket 302*mb* structurally interfaces with base platform 307 and second motor bracket 304*mb* structurally interfaces with the first clamp 302*c*. Visible here also are annular threaded receiving features 604*t* of the first and second spindle motor assemblies 302, 304, the significance of which is illustrated and described in more detail in reference to FIGS. 6A-6B.

Axial Flux Electromagnet (AFEM) Motor

According to an embodiment, each of the first and second spindle motor assemblies 302, 304 comprises an axial flux motor. An AFEM (axial flux electro magnet) motor (at times referred to as a "pancake" motor) is a geometry of motor construction in which the gap between the rotor and stator, and therefore the direction of magnetic flux between the two, is aligned parallel with the axis of rotation rather than radially as with the concentric cylindrical geometry of the more common radial flux or radial gap motor. Generally, an AFEM motor can provide greater electromagnetic torque relative to any conventional radial flux motor, for a given electromagnetic volume (e.g., considering the stack length of the stator and the mean diameter of the air gap, or power density), has a shorter more direct magnetic flux path, and better cooling characteristics.

Figure 5A:
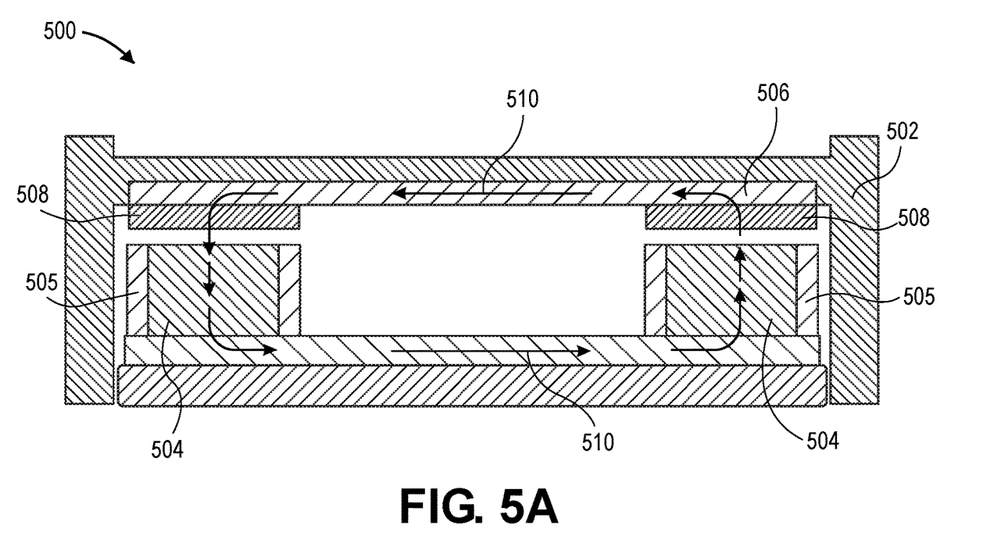
FIG. 5A is a side view illustrating an axial flux motor, according to an embodiment.
Figure 5B:
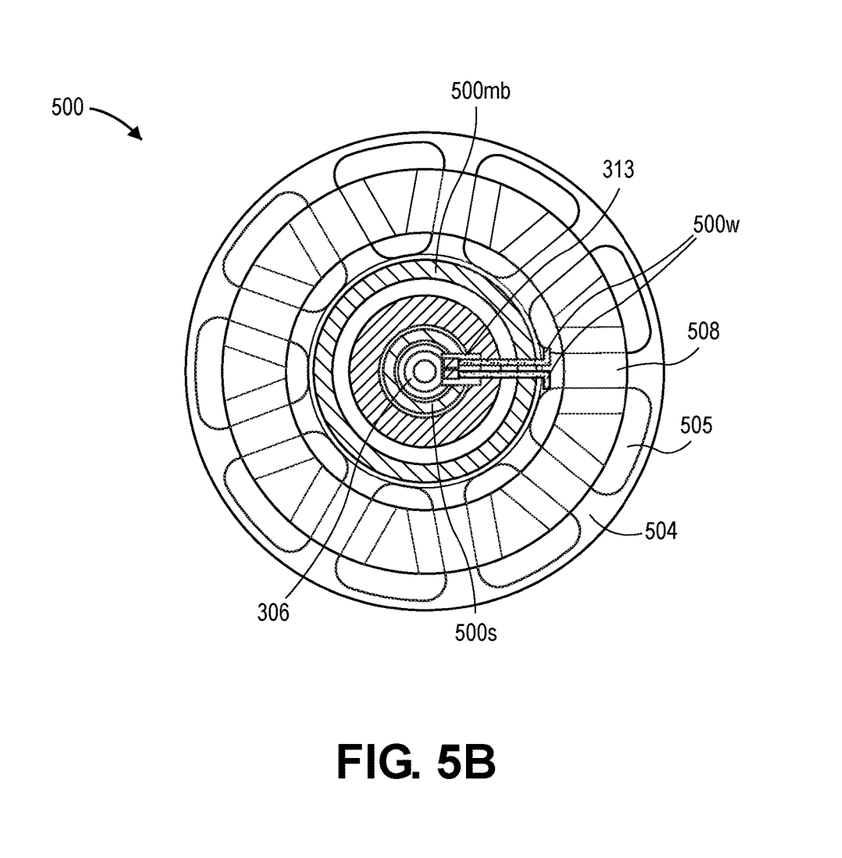
FIG. 5B is a cross-sectional plan view illustrating the axial flux motor of FIG. 5A, according to an embodiment.

FIG. 5A is a side view illustrating an axial flux motor, and FIG. 5B is a cross-sectional plan view illustrating the axial flux motor of FIG. 5A, both according to an embodiment. AFEM motor 500 (or simply "motor 500") of FIG. 5A depicts an example axial flux electromagnet(ic) motor comprising a rotating/rotatable motor hub 502, a stator 504 with a plurality of coils 505 each wound around a corresponding core protrusion, a yoke 506 (e.g., cast iron or steel) for carrying magnetic flux 510 through the poles, and an axially-magnetized annular magnet 508 (e.g., for rotor). The number of turns and wire gage for the stator coils 505 can be designed and optimized for a specific electromangetic torque to meet the product minimum requirements according to the electric and magnetic loadings. For suitable non-limiting examples, rotor magnet 508 may be magnetized axially to have 12 poles (with 9 stator slots), 8 poles (with 12 stator slots), of 16 poles (with 12 stator slots), with 9 slots depicted in the example of FIG. 5B.

FIG. 5B further depicts the base post 306 encompassed by a spindle motor shaft 500*s* (see, e.g., hollow shaft 302*s*, 304*s* of FIG. 3A), supported by a motor bracket 500*mb* (see, e.g., motor bracket 302*mb*, 304*mb* of FIGS. 3A-4), along with the motor electrical wiring 500*w* (see, e.g., electrical wiring 302*w*, 304*w* of FIGS. 3A-3B) routed to electrical connector 313 along structural cutout 306*c* feature of the base post 306 (see, e.g., electrical connector 313 of FIGS. 3A-3B). Again, an AFEM motor provides a suitable and compact implementation in this context, i.e., stacking multiple spindle motor assemblies spatially efficiently onto a shared base post in a highly-performant multi-disk pack HDD, because it can provide greater electromagnetic torque relative to a conventional radial flux motor for a given electromagnetic volume for example.

Threaded Disk Clamp

Figure 6A:
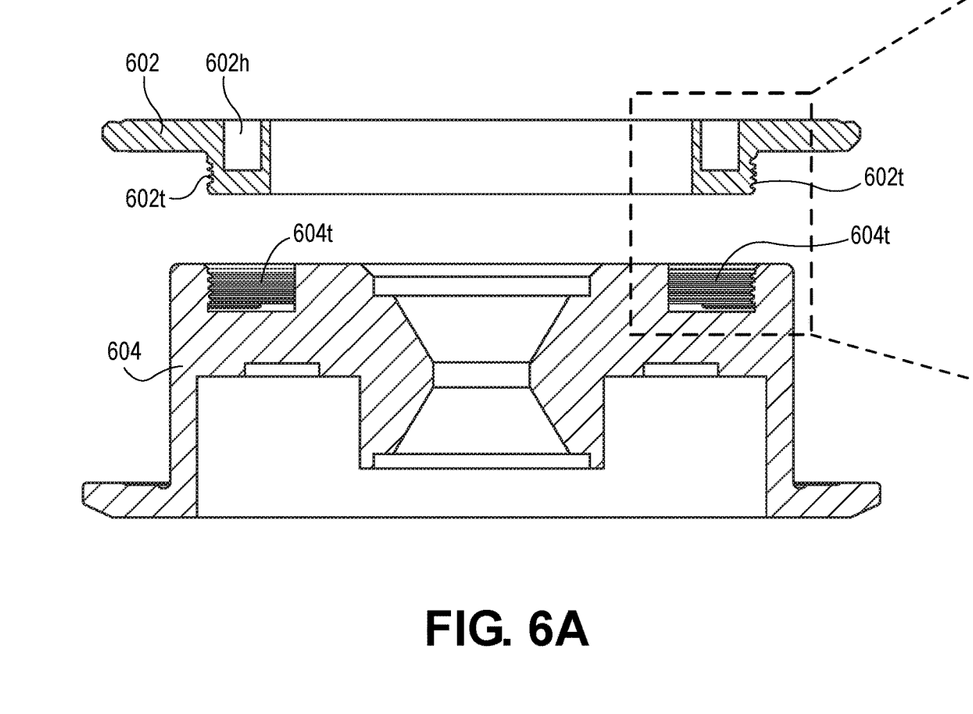
FIG. 6A is a cross-sectional side view illustrating a disk clamp for the disk pack of FIG. 3A, according to an embodiment.
Figure 6B:
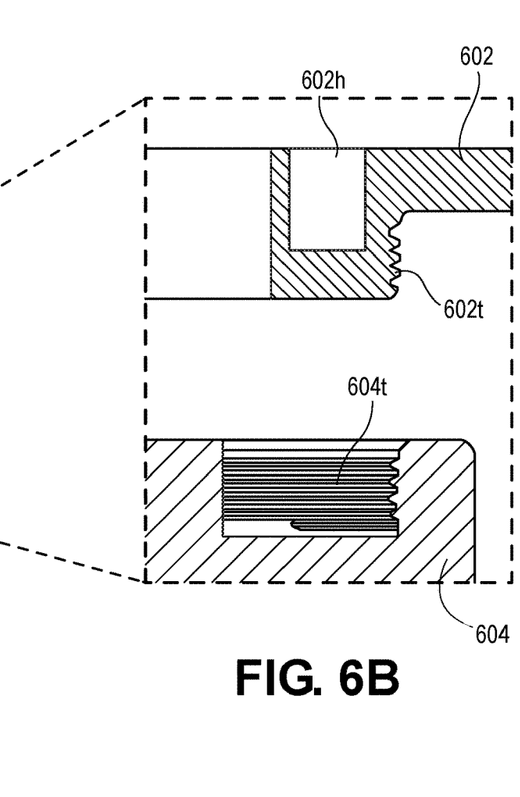
FIG. 6B is a magnified cross-sectional side view illustrating a portion of the disk clamp of FIG. 6A, according to an embodiment.

FIG. 6A is a cross-sectional side view illustrating a disk clamp for the disk pack of FIG. 3A, and FIG. 6B is a magnified cross-sectional side view illustrating a portion of the disk clamp of FIG. 6A, both according to an embodiment. In view of the need for a vertically (i.e., z-height, consistent with the axis of rotation of the spindle motors) compact disk clamp, a threaded disk clamp and spindle motor interface is described, according to an embodiment.

An annular threaded receiving feature 604t of the first and second spindle motor assemblies 302, 304 (FIGS. 3A-4) was previously introduced herein. As depicted, a spindle motor hub 604, which may be implemented for hub 302h, 304h (FIG. 3A) for each of the first and second spindle motor assemblies 302, 304, comprises an internal side threading on an outer perimeter of an annular threaded receiving feature 604t. That is, hub 604 comprises an annular threaded recess or channel, i.e., threaded receiving feature 604t, which has an outer thread. This threaded receiving feature 604t functions as an affixing receiver for a correspondingly threaded feature of a disk clamp 602. Disk clamp 602, which may be implemented for clamp 302c, 304c (FIGS. 3A, 4) for each of the first and second spindle motor assemblies 302, 304, comprises circumferential threading 602t on an outer perimeter of a hub of the disk clamp 602, configured to mechanically mate with the threaded receiving feature 604t of a corresponding spindle motor hub 604. According to an embodiment, positioning (e.g., tooling) holes 602h are provided around the perimeter of the disk clamp 602 hub, but for which threaded fasteners are not needed for a sufficient clamping force. Thus, a vertically compact disk clamp 602 is provided which is effectively and largely recessed or embedded within the corresponding motor hub 604 by way of the mating threaded features 602t, 604t, which is in contrast with a conventional disk clamp positioned over the top of the disk stack and requiring several fasteners around its perimeter for sufficient clamping force. Such a compact disk clamp 602-motor hub 604 arrangement thus further enables a spatially efficient implementation for a stacked multiple spindle motor, multi-disk pack HDD.

Method of Assembling Multi-Disk Pack Hard Disk Drive

Figure 7:
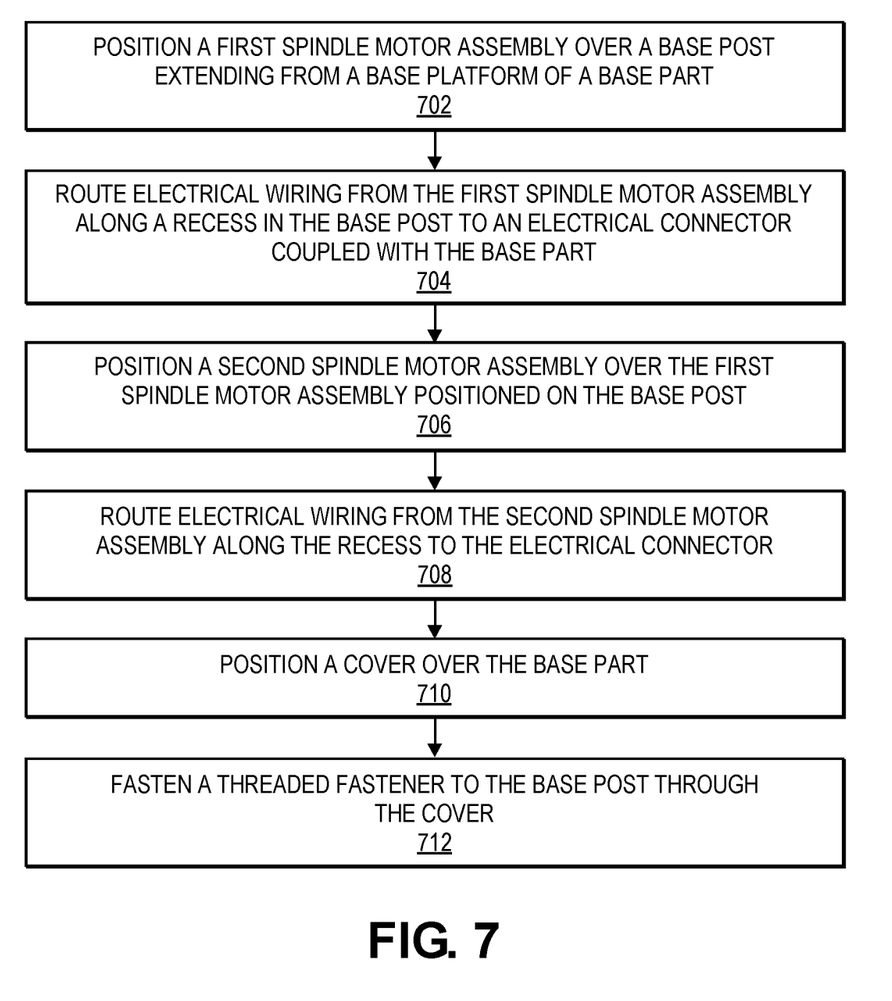
FIG. 7 is a flow diagram illustrating a method of assembling a multi-disk pack hard disk drive, according to an embodiment.

FIG. 7 is a flow diagram illustrating a method of assembling a multi-disk pack hard disk drive, according to an embodiment.

At block 702, position a first spindle motor assembly over a base post extending from a base platform of a base part. For example, hollow shaft 302s (FIG. 3A) of the first spindle motor assembly 302 (FIGS. 3A-4) is positioned over and around base post 306 (FIGS. 3B-4) extending from base platform 307 (FIGS. 3B-4).

At block 704, route electrical wiring from the first spindle motor assembly along a recess in the base post to an electrical connector coupled with the base part. For example, electrical wiring 302w (FIGS. 3A-3B) of spindle motor assembly 302 is routed along structural cutout 306c (FIG. 3B) feature of the base post 306 to the electrical connector 313 (FIGS. 3A-3B, 5B).

At block 706, position a second spindle motor assembly over the first spindle motor assembly positioned on the base post. For example, hollow shaft 304s (FIG. 3A) of spindle motor assembly 304 (FIGS. 3A-4) is positioned over the spindle motor assembly 302 already positioned on the base post 306 (block 702), which positions spindle motor assembly 304 also over and around base post 306.

At block 708, route electrical wiring from the second spindle motor assembly along the recess in the base post to an electrical connector coupled with the base part. For example, electrical wiring 304w (FIGS. 3A-3B) of spindle motor assembly 304 is routed along structural cutout 306c feature of the base post 306 to the electrical connector 313.

At block 710, position a cover over the base part. For example, HDD cover 310 (FIG. 4) is positioned over an HDD base part (see, e.g., HDD housing 168 of FIG. 1).

At block 712, fasten a threaded fastener to the base post through the cover. For example, screw 308 (FIGS. 3B-4) is fastened to the base post 306 through the HDD cover 310.

In general, one approach to increasing HDD performance involves implementation of multi-actuator systems in which multiple independently operating actuators are configured to independently and concurrently read from and/or write to multiple recording disks of a disk pack (or "disk stack"). A dual-actuator or split actuator HDD involves use of dual VCMs (voice coil motor) in order to increase the performance. Furthermore, with a "split single actuator" configuration, the use of only one actuator actively at a time is contemplated. By adding a second spindle motor within the drive and dividing the disks among the motors, finer control over the usage and power consumption of each disk pack is enabled. That is, use of a dual spindle motor design such as multi-disk pack system 300 (FIGS. 3A-4) can address the increasing power challenges due to increased activity on the media by way of increasing performance using split actuator designs. Stated otherwise, power consumption can be greatly reduced because part of the drive is not being used at any given time and, therefore, each set of spindle motor and actuator may be independently controlled to operate in a low-power or idle mode or turned off altogether to save power.

Physical Description of Illustrative Operating Context(s)

Embodiments may be used in the context of a digital data storage device (DSD) such as a hard disk drive (HDD). Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or "motor base assembly" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176.

Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A hard disk drive (HDD) comprising:
a base part comprising a base post extending from a base platform;
a first spindle motor assembly comprising:
a first motor bracket, and
a first disk clamp; and
a second spindle motor assembly comprising:
a second motor bracket, and
a second disk clamp;
wherein:
the first spindle motor assembly is mounted on the base post such that the first motor bracket interfaces with the base platform; and
the second spindle motor assembly is mounted on the base post over the first spindle motor assembly such that the second motor bracket interfaces with the first disk clamp.

2. The HDD of claim 1, wherein each of the first and second spindle motor assemblies comprises an axial flux motor.

3. The HDD of claim 1, further comprising:
an electrical connector coupled with the base part; and
wherein:
the first spindle motor assembly further comprises first electrical wiring routed along the base post to the electrical connector; and
the second spindle motor assembly further comprises second electrical wiring routed along the base post to the electrical connector.

4. The HDD of claim 3, wherein each of the first and second electrical wiring is routed within a structural cutout feature of the base post.

5. The HDD of claim 1, wherein:
each of the first and second spindle motor assemblies further comprises an internal side threading on an outer perimeter of an annular threaded receiving feature of a respective spindle motor hub; and
each of the first and second disk clamps comprises circumferential threading, on an outer perimeter of a clamp hub, configured to mechanically mate with the threaded receiving feature of a corresponding spindle motor hub.

6. The HDD of claim 1, wherein each of the first and second spindle motor assemblies further comprises a hollow shaft through which the base post is positioned.

7. The HDD of claim 6, further comprising:
a top cover; and
a screw through the top cover and threadedly engaged with the base post.

8. The HDD of claim 1, further comprising:
first disk media rotatably mounted on the first spindle motor assembly; and
second disk media rotatably mounted on the second spindle motor assembly;
wherein the first spindle motor assembly is configured for rotating the first disk media independently of the second spindle motor assembly rotating the second disk media.

9. The HDD of claim 1, further comprising:
first disk media rotatably mounted on the first spindle motor assembly;
second disk media rotatably mounted on the second spindle motor assembly;
first head sliders each housing a read-write transducer configured to read from and to write to a respective disk medium of the first disk media;
a first actuator configured for moving the first head sliders to access portions of the first disk media;
a second head sliders each housing a read-write transducer configured to read from and to write to a respective disk medium of the second disk media; and
a second actuator configured for moving the second head sliders to access portions of the second disk media.

10. The HDD of claim 9, wherein:
the first spindle motor assembly is configured for rotating the first disk media independently of the second spindle motor assembly rotating the second disk media; and
the first actuator is configured for moving the first plurality of head sliders to access portions of the first disk media independently of the second actuator moving the second plurality of head sliders to access portions of the second disk media.

11. The HDD of claim 1, further comprising:
first disk media rotatably mounted on the first spindle motor assembly;
second disk media rotatably mounted on the second spindle motor assembly;
head sliders each housing a read-write transducer configured to read from and to write to a respective disk medium of the first and second disk media; and
a single actuator configured for moving the head sliders to access portions of the first and second disk media.

12. The HDD of claim 1, further comprising:
first disk media rotatably mounted on the first spindle motor assembly;
second disk media rotatably mounted on the second spindle motor assembly;
head sliders each housing a read-write transducer configured to read from and to write to a respective disk medium of the first and second disk media;
an actuator elevator assembly; and
an actuator mounted on the actuator elevator assembly and configured for moving the plurality of head sliders to access portions of the first and second disk media.

13. A method of assembling a hard disk drive (HDD), the method comprising:
positioning a first spindle motor assembly, comprising a first motor bracket and a first disk clamp, over a base post extending from a base platform of a base part such that the first motor bracket interfaces with the base platform;
positioning a second spindle motor assembly, comprising a second motor bracket and a second disk clamp, over the first spindle motor assembly positioned on the base post such that the second motor bracket interfaces with the first disk clamp;
positioning a cover over the base part; and
fastening a threaded fastener to the base post through the cover.

14. The method of claim 13, wherein positioning each of the first and second spindle motor assemblies includes positioning each spindle motor assembly comprising an axial flux motor.

15. The method of claim 13, further comprising:
routing electrical wiring from the first spindle motor assembly along a recess in the base post to an electrical connector coupled with the base part; and
routing electrical wiring from the second spindle motor assembly along the recess to the electrical connector.

16. The method of claim 13, wherein:
positioning each of the first and second spindle motor assemblies includes positioning each spindle motor assembly comprising a disk clamp hub having circumferential threading on an outer perimeter which is threadedly fastened to an internal side threading of an annular threaded receiving feature of a respective spindle motor hub.

17. The method of claim 13, wherein:
positioning each of the first and second spindle motor assemblies includes positioning a hollow shaft over the base post.

18. The method of claim 13, wherein:
positioning each of the first and second spindle motor assemblies includes positioning each spindle motor assembly comprising disk media rotatably mounted thereon; and
the first spindle motor assembly is configured for rotating its corresponding disk media independently of the second spindle motor assembly rotating its corresponding disk media.

19. A multi-actuator hard disk drive (HDD) comprising:
a base part comprising a base post extending from a base platform;
a first spindle motor assembly comprising a hollow shaft mounted on the base post such that a first bottom bracket of the first spindle motor assembly interfaces with the base platform, the first spindle motor assembly further comprising:
a first disk clamp comprising circumferential threading on an outer perimeter of a clamp hub, configured to mechanically mate with an internal threading on an outer perimeter of an annular threaded receiving feature of a corresponding spindle motor hub of the first spindle motor assembly, and
first disk media mounted on the spindle motor hub;
a second spindle motor assembly comprising a hollow shaft mounted on the base post over the first spindle motor assembly such that a second bottom bracket of the second spindle motor assembly interfaces with the first disk clamp, the second spindle motor assembly further comprising:
second disk media mounted on a spindle motor hub of the second spindle motor assembly;
a first actuator system comprising:
first means for moving first head sliders to access portions of the first disk media, wherein each first head slider houses a read-write transducer configured to read from and to write to at least one disk medium of the first disk media; and
a second actuator system comprising:
second means for moving second head sliders to access portions of the second disk media, wherein each second head slider houses a read-write transducer configured to read from and to write to at least one disk medium of the second disk media.

20. The multi-actuator HDD of claim 19, wherein each of the first and second spindle motor assemblies comprises an axial flux motor.

21. The multi-actuator HDD of claim 19, further comprising:
an electrical connector coupled with the base part;
wherein:
the first spindle motor assembly further comprises first electrical wiring routed within a structural recess in the base post to the electrical connector; and
the second spindle motor assembly further comprises second electrical wiring routed within the structural recess to the electrical connector.

22. The multi-actuator HDD of claim 19, wherein the first spindle motor assembly is configured for rotating the first disk media independently of the second spindle motor assembly rotating the second disk media.

* * * * *